United States Patent
De Barrau

[15] 3,663,286
[45] May 16, 1972

[54] ADJUVANT COMPOSITION FOR CONCRETES AND MORTARS

[72] Inventor: Andre De Barrau, Paris, France

[73] Assignee: Gerard Henri Jules Leruste, Paris, France a part interest

[22] Filed: Feb. 26, 1970

[21] Appl. No.: 14,673

[52] U.S. Cl. ...............................106/314, 106/89, 106/315
[51] Int. Cl. .......................................................C04b 13/22
[58] Field of Search ..............................106/89, 97, 314, 315

[56] References Cited

UNITED STATES PATENTS

| | | | |
|---|---|---|---|
| 3,334,452 | 8/1967 | Savage | 106/315 |
| 2,292,616 | 8/1942 | Dailey | 106/315 |
| 2,228,539 | 1/1941 | Stark | 106/314 |

*Primary Examiner*—Tobias E. Levow
*Assistant Examiner*—W. T. Scott
*Attorney*—Melville, Strasser, Foster and Hoffmann

[57] ABSTRACT

Adjuvant composition for concretes and mortars adapted to be dissolved in the mixing water. This composition consists basically of an aqueous mixture of at least four inorganic salts, viz, a borate, a sulfite, a nitrate, and a hyposulfite. Particularly, it comprises sodium borate, sodium sulfite, potassium nitrate and sodium hyposulfite. A particular formulation is as follows:

| | |
|---|---|
| water | 500 ml |
| sodium borate | 5g |
| sodium sulfite | 20 g |
| potassium nitrate | 160 g |
| sodium hyposulfite | 800 g |

Applications to the production of mortars, concretes, aggregate, and any constructional material.

8 Claims, No Drawings

ADJUVANT COMPOSITION FOR CONCRETES AND MORTARS

This invention relates to the field of constructional materials and is more especially directed to an adjuvant composition which may be used in conjunction with a binder for producing mortars and concretes.

In the production of a mortar or a concrete, the initial step is to mix with water a mixture of sand, fine ravel, and a hydraulic binder. These various components should be accurately proportioned, in dependence on the conditions of use and intended purposes, according to standards recommended after a laboratory study. When the mixing is completed, the resulting mass should be sufficiently supple and adhesive, containing only the minimum amount of water required for suitable hydration of the binder and complying as precisely as possible with the aforesaid standards. As a matter of fact, any excessive amount of mixing water is known to decrease the binder reactivity, this resulting in substantial reduction in the final strength values and quality of the products obtained, and being moreover the major cause of shrinkage.

However, with the theoretical amount of water, the mortar or the concrete obtained is too dry and without adhesive power. It cannot be used in current work since the amount of water, already insufficient, is partly transferred to dry surfaces to which it is applied. It is therefore a practical requirement to over-dampen the mass and even to use sometimes a great excess of mixing water to permit the laying on of the mortar or the concrete.

The main object of the invention is to provide an adjuvant composition adapted, as diluted in the mixing water, to both facilitate the working up of mortars and concrete and impart thereto high strengths and outstanding imperviousness.

The composition according to the invention is characterized by an aqueous mixture of at least four inorganic salts, viz, a borate, a sulfite, a nitrate, and a hyposulfite.

The basic composition according to the invention is in the form of an aqueous solution supersaturated with the four aforesaid salts. Such a basic composition may be diluted in the mixing water in an amount of about 5 to 15 percent by volumes.

This basic or adjuvant composition is a liquid having a density higher than 1 g/cc and generally of about 1.4 g/cc, which is soluble in water in any proportion.

For 500 parts by weight of water preferably previously demineralized or at least of a purity approximating that of spring water, the respective amounts of the various alkaline or alkaline-earth salts, as expressed in parts by weight, may be within the following ranges:

| borate | 3 to 10 parts |
| sulfite | 15 to 30 parts |
| nitrate | 130 to 200 parts |
| hyposulfite | 700 to 850 parts. |

For reasons of practical convenience, the particular salts used are sodium borate, sodium sulfite, potassium nitrate and sodium hyposulfite. Advantageously the borate cation and sulfite cation are identical, while the nitrate cation and hyposulfite cation are different.

These alkaline or alkaline-earth salts are preferably dissolved in hot water at a temperature slightly lower than the boiling point, e.g., 80°–100° C. An example of a particular formulation which provided good results is as follows:

| Water | 500 ml. |
| sodium borate | 5 g. |
| sodium sulfite | 20 g. |
| potassium nitrate | 160 g. |
| sodium hyposulfite | 800 g. |

It will be seen that the total weight of dissolved salts is 985 g, this providing a supersaturated, highly concentrated solution. This facility of dissolution of the various salts is a surprising aspect of the invention. Suffice it to note in this respect that the maximum amount of sodium hyposulfite which can be dissolved in 500 ml of water in the aforesaid conditions is 200 g. Thus, the salt mixture provided by the invention has a real synergistic action evidenced by an unusual increase in the solubility of the salts.

The specific above composition is in the form of a perfectly fluid solution showing no tendency to crystallize and having a density close to 1.4 g/cc.

To prepare this composition, the following amounts of the salts can be successively dissolved, in the order mentioned and by increments, in hot water (initially at 80°–100° C):

| spring water at 80–100° C. | 500 ml. |
| sodium borate | 5 g. |
| sodium sulfite (5 g. × 4) | 20 g. |
| potassium nitrate (20 g. × 8) | 160 g. |
| sodium hyposulfite (160 g. × 5) | 800 g. |

In practice, it was found that it is quite unnecessary, and indeed unadvisable, to maintain the water at its initial temperature throughout the salt dissolving procedure. The cooling effect of the successive dissolutions should merely be compensated by such re-heating as may be required to keep the dissolving temperature in the range of about 40°–60° C.

Further, in the final composition there may be added complemental additives, especially salts known to have an accelerating or catalytic effect in binders for constructional materials, viz, nickel and cobalt salts. Said salts may be incorporated in small amounts, e.g., one to two parts per 1,000 parts of the final composition. Other substances may be added to prevent or reduce the tendency to crystallize, for example glycerin.

When the aforesaid basic composition is introduced in the mixing water in an amount of 5 to 10 percent by volume, the binder will become colloidal and the water consumption is then by at least 5 percent lower than the theoretical quantity of water required for the mixing. Over-dampening caused by excessive amounts of mixing water is therefore eliminated, this preventing any reduction in reactivity and the prejudicial effects thereof on the properties of the final materials.

The adjuvant provided by the invention has a complex function. The product according to the invention seems to introduce important changes in the texture of the binder, which becomes plastic and highly adhesive, to accelerate the setting and hardening, and to cause during the hardening process some chemical changes within the mass, as well as overall mineralization.

While the following theoretical considerations imply no limitation as to the scope of the invention, a description will now be given of the observations made on the present product activity, which is initiated upon mixing and has three successive effects.

a. plasticizing of the binder,
b. superficial attack of the mortar components (gelling)
c. accelerating of the setting with chemical changes (mineralization).

a. Plasticizing of the Binder

As soon as the mixing begins, due to the fact that the water treated by the adjuvant of the invention forms with the cement a binder of colloidal texture, a minimum amount of water will provide a supple, highly adhesive mass with great cohesive strength or body. Moisture retention is very good, with proportionate improvement in the application and general masonry work.

The surfaces of the aggregate are lubricated by this colloidal binder and closely embedded therein. The components such as sand or small gravel can readily come to rest on one another by gravitational effect, while the formation of air occlusions and cavities is prevented. Either with or without vibration, a very high degree of compactness is obtained after hardening.

The change-over of the binder to the colloidal state results from the chemical action exerted by the sodium and potassium salts contained in the composition according to the invention.

b. Gelling

Immediately upon setting, the elemental sulfur of the sulfites and hyposulfites is dissociated from the salts and available in the nascent state in finely divided form. The conditions are suitable for hydro-oxidation of this elemental sulfur. An analysis of the mortars after hardening shows the formation of thio-acids.

These acids react in the presence of the carbonates in the mortar, thereby releasing carbon dioxide which is in the nascent state and thus highly reactive.

Carbon dioxide in the nascent state has a very strong solvent action on all minerals, including silica. The utilization of this property is a characteristic result of the use of the adjuvant according to the invention. The mortar components being stirred by the carbon dioxide undergo surface disintegration, thereby producing a silica gel.

The mortar then acquires its full plasticity, with the characteristic trembling consistency of colloidal materials, In addition to the advantageous ease of application and adhesiveness, said gel affords optimum conditions for binder rehydratation and for the overall chemical reactions.

c. Accelerating of the Setting (Mineralization).

The setting is accelerated to a high degree, especially with the slag metallurgical cements. This allows for quick framing removal and for casting in freezing weather around the limit of −7° C.

As evidenced by chemical analysis, the chemical changes are attended by the formation of calcium thionates, constituting a highly tough and strong material.

The binder activity continues during the whole ageing process, i.e., over a long period. Laboratory analyses evidence a through mineralization with polydirectional crystallization. The phenomenon of interlaced crystal growth is that which imparts to natural rocks their hardness, stability, and tough compactness. This phenomenon, which is artificially induced according to the invention within a mortar or concrete, therefore accounts for the outstanding qualities thereof. In the ageing process of ordinary concrete, lamellar structures are formed and, under these conditions, no uniform strengths can exist.

However, such strengths are provided by the use of the adjuvant according to the invention, along any direction, the resiliency properties of the material being then outstanding.

The various above-described properties correspond to a chemically stable structure of the resulting mortars and concretes. Chemical strength and stability are thus secured. The advantageous characteristics are afforded in a surprising manner by the adjuvant according to the invention. In fact, it is known that, without a suitable binder, the chemical combinations of the cement with the other components are bound to dissociate with time. In contrast, the laboratory tests made on mortars treated with the adjuvant according to the invention show that the properties acquired by the mortar remain stable with time.

The novel materials provided by the invention can find applications in all the usual fields of application of mortars and concretes. Besides, they can be applied on conventional concretes, becoming fused therewith due to their great adhesiveness. Similarly, a mortar according to the invention can be applied as a strongly adherent coat, even in a thin layer. In numerous cases, no grid or lattice structures need to be set on the surface to be coated. In such applications, the coating can be applied in a single step, in the form of a thick layer. These adherence properties are used in reinforced concretes. The surfaces of the materials obtained according to the invention are not crumbly and have good resistance to corrosive agents. They are easy to keep clean since they may readily be washed and scrubbed.

In outdoors work, the materials remain unaffected by weather conditions, notably frost, even at their surface. Moreover, such materials afford at least as good heat- and sound-insulation as conventional mortars and concretes.

The invention can also be applied to the fabrication of aggregate for producing concretes of most diverse types. Thus, there may be prepared granite-like products, slabbings, artificial facing stones and any other similar material. As fillers, widely different materials can be used, such as ground stone, crushed glass, sawdust, etc.

It will therefore be appreciated that the invention can find numerous applications.

The following illustrative examples are given to show the properties as well as possible uses and applications of the adjuvant according to the invention.

EXAMPLE 1

In the hereunder reported tests, the adjuvant used had the following composition:

| | |
|---|---|
| water | 500 ml. |
| sodium borate | 5 g. |
| sodium sulfite | 20 g. |
| potassium nitrate | 160 g. |
| sodium hyposulfite | 800 g. |

The amount of adjuvant used, as related to the amount of mixing water, was varied according to the requirements and service conditions. Generally, the amount of adjuvant ranges from 5 to 10 percent by volume of the water. In other words, the suitable proportioning is 1 liter of adjuvant for about 9 to 19 liters of water. Besides, for great concrete bulks, this proportion can be somewhat reduced. According to conventional practice, the amount of water is some 145 liters per cubic meter of concrete. According to the invention, a suitable proportion for bulky concrete work is 7 liters of adjuvant per cubic meter of concrete. The effective amount of mixing water will in this case be $145 - 7 = 138$ liters.

The tests reported hereunder were made on concretes produced with a mixing water containing 5 percent (for concrete A) or 10 percent (for concrete B) by volume of adjuvant, with the formulations shown in the following table:

TEST FORMULATIONS

| Components | Reference concrete | Concrete A | Concrete B |
|---|---|---|---|
| Small gravel No. 1 | 950 kg. 710 l | 950 kg. 720 l | 970 kg. 720 l. |
| Sand (of the so-called "rice grain" variety). | 540 kg. 360 l | 550 kg. 370 l | 550 kg. 370 l. |
| Sea sand | 290 kg. 210 l | 300 kg. 210 l | 300 kg. 210 l. |
| Portland cement (Lafarge 250/315). | 350 kg | 350 kg | 350 kg. |
| Water | 210 l without adjuvant. | 200 l with adjuvant. | 200 l with adjuvant. |

It should be noted that in the above formulations, the amounts of water used were determined taking into account the plasticity test, so that the three concretes have the same final plasticity. Similarly, the amounts of aggregate were slightly varied in the concretes so as to provide the same volumetric efficiency.

Results

These concretes were compared to concretes prepared in conventional manner with an equivalent amount of mixing water, but without adjuvant.

a. Plasticity

The concrete obtained has a higher plasticity than conventional concrete. The plasticity measurements were made with a plasticity meter of the MEYNIER type. The results are shown in Table I.

TABLE I

Concrete sagging time measured with the MEYNIER plasticity meter (in seconds)

| | |
|---|---|
| Reference concrete: | 40 sec. |
| Concrete A: | 35 sec. |
| Concrete B: | 34 sec. |

Concretes A and B can be put up without vibration, if required, and in some cases without framing. They are of particular interest for work involving injection of concrete under pressure.

b. Compression strength

The following Table II shows the percent increases in the compression strengths of concretes A and B as related to the reference concrete.

TABLE II

Percent increase in compression strength as related to conventional concrete

| | After 7 days | After 28 days |
|---|---|---|
| Concrete A | 8.4 | 9.4 |
| Concrete B | 19.2 | 27.4 | c. Tensile strength

Table III shows results obtained in similar manner as those in Table II.

TABLE III

Percent increase in tensile strength as related to conventional concrete

| | After 7 days | After 28 days |
|---|---|---|
| Concrete A | 29.4 | 18.5 |
| Concrete B | 57.- | 32.6 |

Thus, the invention provides a spectacular increase in concrete strengths. Due to this property, the ironwork can be reduced or even completely eliminated in hydraulic (marine) constructions.

The following Table IV is a record of the true values found for the mechanical strengths of concretes.

TABLE IV

| | Compression strength | | | | Tensile Strength | |
|---|---|---|---|---|---|---|
| | 7 days | | 28 days | | 7 days | 28 days |
| | Density, T*/cm.³ | Strength, kg./cm.² | Density, T/cm.³ | Strength, kg./cm.² | Strength, kg./cm.² | Strength, kg./cm.² |
| Reference concrete | 2.32 | 235 | 2.32 | 287 | 14 | 22 |
| | 2.33 | 240 | 2.31 | 300 | 19 | 23 |
| | 2.32 | 260 | 2.30 | 310 | 19 | 23 |
| Mean value | 2.32 | 245 | 2.31 | 299 | 17 | 22.6 |
| Concrete A | 2.33 | 250 | 2.36 | 324 | 19 | 26.5 |
| | 2.36 | 270 | 2.30 | 327 | 24 | 26.5 |
| | 2.39 | 275 | 2.33 | 330 | 25 | 27.5 |
| Mean value | 2.36 | 265 | 2.33 | 327 | 22 | 26.8 |
| Concrete B | 2.39 | 290 | 2.38 | 380 | 26 | 29 |
| | 2.36 | 295 | 2.34 | 382 | 27.5 | 31 |
| Mean value | 2.37 | 293 | 2.36 | 381 | 26.7 | 30 |

*T=metric ton.

d. Shrinkage

With the conventional concrete formulation, the concrete shrinkage per linear meter is of the order of 2–3 mm. For concrete B, the recorded shrinkage is of 0.2 mm.

In fact, it is found that with the concrete prepared according to the invention, shrinkage is always very small and in most cases substantially null. Thus, extensive concrete surfaces such as flags can be cast without interposed joints. This property also acts to prevent cracking after setting.

e. Imperviousness

The novel concretes are completely water-proof. Generally, their surface wettability is low. With hydrocarbons such as kerosene, the concrete will undergo surface impregnation, followed by self-resistance to the impregnation, whereafter the concrete surface is rendered fully impervious. This phenomenon is evidenced if kerosene is stored in a concrete tank which was never used before.

Said imperviousness will be obtained even in thin layers. Said property may be used to advantage for building terraces without resorting to any additional sealing material such as bitumen.

f. Fire resistance

A concrete sample of a size of 25 × 30 × 70 mm was subjected for 2 consecutive hours to a temperature of 700° C, in an electric furnace. Said sample was taken from a concrete of type A which has set in the open air at −7° C and undergone a 30-day hardening.

No deep modification was found in the sample after removal from the furnace.

Concretes prepared according to the invention are apt to withstand the tip temperature of an oxyhydric blow-pipe (1,800° C) and fire temperatures, ranging from 1,000° to 1,200° C.

EXAMPLE 2

The same tests as in Example 1 were made with the same adjuvant composition, but using as a binder metallurgical slag cement ("CHF 325" of Société Thionvilloise France). In every case, the results obtained were equivalent to those noted above.

However, the setting was still further accelerated. Thus after 2 days, the setting rate is found to be increased by 90 percent with respect to the reference sample.

The results of the mechanical tests with the metallurgical slag cement are shown in Table V.

TABLE V

| | Untreated mortars, kg./cm.² | Mortars treated with 10% adjuvant, kg./cm.² | Percent increase |
|---|---|---|---|
| Tensile strength: | | | |
| 2 days | 21 | 40 | 90.5 |
| 7 days | 56 | 83 | 48.2 |
| 28 days | 79 | 84 | 6.3 |
| Compression strength: | | | |
| 2 days | 80 | 155 | 93.7 |
| 7 days | 250 | 345 | 38 |
| 28 days | 430 | 485 | 12.8 |

It will be noticed that, when treated with the adjuvant according to the invention, metallurgical cements are imparted the quick-setting feature they were lacking, while their characteristic qualities are maintained or even improved, so that they can practically be classified as quick-setting cements.

Such concretes, whether obtained from Portland cements or slag cements, can also be case at temperatures lower than 0° C and which can be as low as −7° C. Moreover, due to the quick-setting property, the framing can be removed earlier than with usual concretes.

It will also be appreciated that the setting can be controlled and adjusted by varying the proportion of adjuvant used in the mixing water.

EXAMPLE 3

Obtention and use of a painting or coating product.

A paint was prepared, using as a basic product white Portland cement dissolved in a liquid aqueous composition containing the adjuvant of the invention. Said composition had the following formulation:

| | |
|---|---|
| adjuvant: | 150 ml. |
| saccharose-containing excipient: | 150 ml. |
| gelatin-containing water: sufficient amount for 1000 ml | |

To this formulation were still added accelerator salts of nickel or cobalt.

When all such various components are mixed together in the following proportions:

| | |
|---|---|
| white cement | 1 kg. |
| liquid composition | 500 ml. | the cement is dissolved into a fluid composition. Various pigments, e.g., colored metallic oxides, can be incorporated with this white basic stock.

The resulting paint, which is perfectly cohesive, can be applied with the usual painting equipment and its hardening will occur not merely at the surface through atmospheric oxidation, but throughout its mass, the cement setting at a quite high rate.

This building-trade paint can practically be applied to every material without requiring any undercoating of the substrate.

This paint is especially intended for surface-finishing of works made of dressed up concrete or mortar and will become fused with the substrate in a perfectly stretched state, being resistant to loosening or spalling. The tints are genuine and stable.

The painted surfaces rapidly acquire utmost hardness.

They exert an electrostatic anti-dust and anti-dirt effect.

Moreover, they can serve as an excellent undercoat if a finishing layer of conventional paint or lacquer is desired.

After application of such a paint, there is formed at the surface a hardened mineral coating having the appearance of stone. Depending upon whether it does or does not contain pigments, said coating may be of a pure white or of any color. The surface obtained after painting has a hardness and abrasion resistance which compare favorably with those of the hardest natural rocks.

The amount of pigment incorporated in the paint can be substantial, e.g., of 10 to 35 percent by weight. It should be pointed out that, according to the manufacturers' instructions, the maximum permissible amount of pigment to be introduced in cement is at present some 80 g per kilogram of cement. Higher amounts fail to be absorbed at mixing. With the adjuvant according to the invention, proportions of one-third by weight of pigment for two-thirds by weight of cement can readily be used without causing difficulties resulting from lumping or separation of the pigment powder. The resulting tints are vivid and brilliant and adapted for current decoration, e.g., in the form of durable and artistic frescoes. The coatings obtained can be washed and scrubbed and may be used for outdoor or indoor decoration.

As an undercoating, the above formulation can also be used for fastening ceramic tiles.

EXAMPLE 4

Obtention of novel constructional stocks.

The adjuvant provided by the invention can be used jointly with cement to produce various novel constructional stocks from raw materials which are available at present, but cannot be used in the conventional concrete or mortar formulations. Said materials include the industrial scraps from glass and coke-manufacturing concerns, some sands and stony materials, either in powder or in ground form. Thus, constructional materials can be produced at attractive costs.

For example, it is known that the compositions used previously in artificial stones or stone-like concrete for coating or granite-like facing are not quite satisfactory due to the poor final tensile strengths, to the shrinkage of the binding cement and to the bad resistance to frost, which causes cracking. The adjuvant according to the invention, when used in formulations of this type, allows the obtention of materials similar to natural stone, which are free of the afore-mentioned drawbacks.

Such materials can be used in the same manner as conventional concretes, e.g., for the production of facing boards and flags.

Another field of application of the invention is the utilization of the mean or fine sands at present rejected by the building concerns. By combining the adjuvant according to the invention with various materials such as perlite, vermiculite, sawdust, scoria, widely different constructional materials can be obtained, especially for use in the fields of sound- and heat-insulation.

EXAMPLE 5

Obtention of a cement-plaster compound

It is known that plaster, as mixed in substantial quantity with cement, gives a material of unsatisfactory stability and quality.

However, it might occur to introduce plaster in a cement mortar, as an anti-shrinkage filler. In fact, plaster will expand in the course of setting and its presence might compensate the shrinkage of the clays in the cement.

Surprisingly, it was found that the adjuvant according to the invention has such an action on plaster that the plaster-cement combination acquires chemical stability.

In practice, use was made with good results of 40 to 50 parts of finely ground plaster, which were dry blended very thoroughly with 50 to 60 parts of white cement. For the mixing, water containing about 10 percent by volume of the adjuvant according to the invention is incorporated with the dry mixture thus obtained. The resulting material is very fluid, perfectly cohesive and easy to cast. No shrinkage is found upon removal from the mold. The castings thus produced are valuable and resistant to weathering agents. Such a material is not affected, for example, by boiling water.

This plaster-concrete compound can find very numerous uses in the building trade; by way of merely illustrative examples, it can be used for rough-coating of plaster frontages, waterproofing terraces, for casting constructional elements and generally, for all the applications of plaster. The final product has a hardness approximating that of concrete and is substantially insensitive to weathering agents and moisture, while retaining the various advantages of plaster, viz, fireproof character, lightness, insulating character, etc.

For every application of the plaster-cement mixture, the proportions of constituents will be determined in accordance with previous tests, since said proportions can vary within wide limits.

What I claim is:

1. An adjuvant composition for concretes and mortars, consisting of an aqueous mixture, per 500 parts by weight of water, of from 3 to 10 parts by weight of an alkali or alkaline earth borate, from 15 to 30 parts by weight of an alkali or alkaline earth sulfite, from 130 to 200 parts by weight of an alkali or alkaline earth nitrate, and from 700 to 850 parts by weight of an alkali or alkaline earth hyposulfite.

2. The composition of claim 1, wherein the borate cation and sulfite cation are identical while the nitrate cation and hyposulfite cation are different.

3. The composition of claim 2, which contains sodium borate, sodium sulfite, potassium nitrate and sodium hyposulfite.

4. The composition of claim 1, having approximately the following formulation:

| | |
|---|---|
| water | 500 ml. |
| sodium borate | 5 g. |
| sodium sulfite | 20 g. |
| potassium nitrate | 160 g. |
| sodium hyposulfite | 800 g. |

5. The composition of claim 1, as diluted with the mixing water used for the production of concretes and mortars, the proportion of said composition as related to the mixing water ranging approximately from 5 to 15 percent by volume.

6. The composition of claim 5, as diluted in the mixing water in an amount of about 5 to 10 percent by volume.

7. The method of obtaining an adjuvant composition for concretes and mortars consisting in successively dissolving in 500 parts by weight water, from 3 to 10 parts by weight of an alkali or alkaline earth borate, from 15 to 30 parts by weight of an alkali or alkaline earth sulfite, from 130 to 200 parts by weight of an alkali or alkaline earth nitrate, and from 700 to 850 parts by weight of an alkali or alkaline earth hyposulfite in water at an initial temperature of about 80° to 100° C. and in then maintaining the temperature at about 40° to 60° C. during dissolution.

8. The method of claim 7, consisting in dissolving in water the four following salts, in the mentioned order and by fractions as defined:

| | |
|---|---|
| water | 500ml. |
| sodium borate | 5 g. |
| sodium sulfite (4 fractions of 5 g.) | 20 g. |
| potassium nitrate (8 fractions of 20 g.) | 160 g. |
| sodium hyposulfite (5 fractions of 160 g.) | 800 g. |

* * * * *